3,647,810
1,2,4-TRIAZOLE METAL SALT COMPLEXES

Horst O. Bayer, Levittown, Richard S. Cook, Doylestown, and William C. von Meyer, Willow Grove, Pa., assignors to Rohm and Haas Company, Philadelphia, Pa.
No Drawing. Filed July 3, 1969, Ser. No. 847,482
Int. Cl. C07d 55/06
U.S. Cl. 260—299  10 Claims

ABSTRACT OF THE DISCLOSURE

Novel compounds belonging to the class of metal salt complexes of 4-substituted-1,2,4-triazoles. These compounds are useful fungicides.

---

This invention is concerned with novel compounds belonging to the class of 4-substituted-1,24-triazole-metal salt complexes. These novel compounds may be represented by the formula

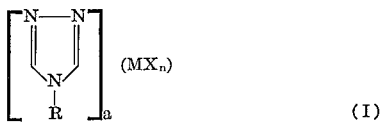

(I)

wherein R is selected from the group consisting of alkyl, straight or branched, of 1 to 18 carbon atoms which may be substituted with one or more halo preferably chloro, lower alkoxy, hydroxy, phenyl, nitro, lower-alkylamino or di(lower-alkyl)amino groups, a COY group wherein Y stands for OH, lower alkyl, lower alkoxy or the $NR^1R^2$ group wherein $R^1$ and $R^2$ are hydrogen or lower alkyl, and a phenoxy or thiophenoxy group which may be substituted in the aryl group with lower alkyl, lower alkoxy, halo preferably chloro, or nitro groups; alkenyl of 2 to 6 carbon atoms; alkynyl of 2 to 6 carbon atoms; cycloalkyl of 3 to 8 carbon atoms; aralkyl of up to 10 carbon atoms; aralkyl of up to 10 carbon atoms substituted in the aryl group with lower alkyl, lower alkoxy, halo preferably chloro, and nitro groups; aryl; lower alkyl, lower alkoxy, halo preferably chloro and nitro substituted aryl; and heterocyclic groups, preferably selected from the group consisting of 2-pyridyl, 3-pyridyl, 4-pyridyl, 3-(1,2,4-triazyl), 4-(1,2,4-triazyl), 2-pyrimidyl, 2-thiazyl, 2-benzothiazyl and its chlorinated derivatives;

M is a metal cation, such as cadmium, cobaltous, cupric, ferrous, ferric, manganous, mercuric, nickel, silver, stannous and zinc, with a transition metal cation such as cupic, ferrous, manganous, mercuric and zinc and complexes of the transition metal cation, such as complexes with ammonia or amines, being preferred;

X is an anion forming a compound with the cation M, the said compound having sufficient solubility to form the complexes of the invention, or a dithiocarbamate, preferably an alkylenebisdithiocarbamate such as ethylenebisdithiocarbamate or propylenebisdithiocarbamate, or an N-mono(lower-alkyl)dithiocarbamate or an N,N-di(lower-alkyl)dithiocarbamate;

$a$ is the integer 1 when M is mercuric or silver or when X is alkylenebisdithiocarbamate and is the integer 2 for all other definitions of M and X;

$n$ is an integer which for the anion X satisfies the valence of the metal ion M.

The term lower as used above refers to a carbon content of 1 to 6 carbon atoms. The selection of X is not critical, but for economic reasons preferred anions are acetate, dithiocarbamate, a halide preferably chloride, nitrate and sulfate. The values of M, X, $a$ and $n$ and accordingly the structures of the metal salt complexes are influenced by the nature of the anions.

1,2,4-triazoles are known to be amphoteric in nature, forming salts with acids and with bases (see K. T. Potts, Chemical Reviews 61, 112 (1961). While 3-amino-1,2,4-triazole is known to form precipitates with ferric and cupric ions (see Menoret and Tracez, Compt. rend. 244, 2827 (1957)), there are no literature references to a metal salt complex of a 4-substituted-1,2,4-triazole.

The novel compounds of this invention are prepared by reacting a solution of a 4-substituted-1,2,4-triazole with a solution of a metal salt of the formula $MX_n$ for those cases where X is other than a dithiocarbamate. The following equation depicts this

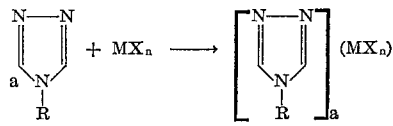

wherein the symbols R, M, X, $a$ and $n$ have the meanings given above. It is preferred that the moles of reagents used correspond to the stoichiometry which appear in the isolated product; however, an excess of the triazole may be used. The complexing of the two reagents proceeds readily at room temperature although any temperature in the range of 0–100° C. may be used. The solvent is not critical and may be any one in which the two reactants are soluble. Preferred solvents are polar ones such as water and alcohols, such as methanol or ethanol. The resulting 4-substituted-1,2,4-triazole-metal salt complex may precipitate or may remain in solution. When the product is an insoluble solid it may be isolated by filtration; otherwise, the product may be isolated by removal of the solvent.

For the case where X is a dithiocarbamate the method of preparation involves reaction of a mixture of the 4-substituted-1,2,4-triazole and a soluble dithiocarbamate salt with a solution of the metal salt $MX_n$ where X is other than dithiocarbamate. Typical dithiocarbamate salts which may be used include sodium, potassium, calcium and ammonium. An excess of the dithiocarbamate is to be avoided since this would result in the concurrent formation of some metallic dithiocarbamate. An excess of the 1,2,4-triazole may be used. The reaction conditions for this are the same as given above for $MX_n$ salts in general. Water is the preferred solvent. The following equation using sodium ethylenebisdithiocarbamate as the dithiocarbamate reactant and where $n$ is 2 depicts a typical reaction

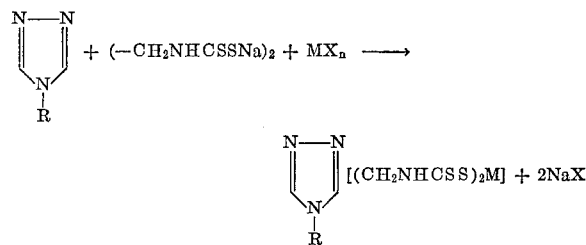

In all cases these products are water insoluble solids and are isolated by filtration, centrifuging or other methods known in the art for insoluble products. Based on a reaction of dithiocarbamates as known from the literature, such as Belgian Pat. 706,936 (based on U.S. Ser. No. 598,599, filed Dec. 2, 1966), it would be predicted that the product obtained from the above reaction would be an onium metal ethylenebisdithiocarbamate.

The 4-substituted-1,2,4-triazole-metal salt complexes are solids with characteristic melting or decomposition points. In many instances they may be recrystallized from appropriate solvents such as water, dimethylformamide, acetone and mixtures of these.

Certain of the intermediate 4-substituted-1,2,4-triazoles are known compounds. One convenient method of preparation is by the transamination of N,N-dimethylformamide azine with primary amines, as described by Bartlett and Humphrey, J. Chem. Soc. 1967, 1664–1666. The reaction may be depicted as

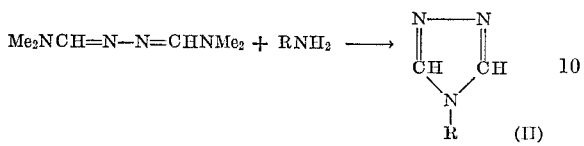

The reaction is conveniently run at reflux temperature in a solvent such as benzene and is catalyzed by acids such as p-toluenesulfonic acid. They may also be made by the method of Wiley and Hart as described in J. Org. Chem., 18, 1368 (1953) which involves the reaction of diformylhydrazine with an aliphatic, aromatic or heterocyclic primary amine.

The intermediate compounds of Formula II may also be made by reaction of an orthoformate, $(R'O)_3CH$, with formylhydrazine to give an N-alkoxymethylene-N'-formylhydrazine which is then reacted with a primary amine, $RNH_2$, wherein R has the meaning given above. The following reaction depicts this:

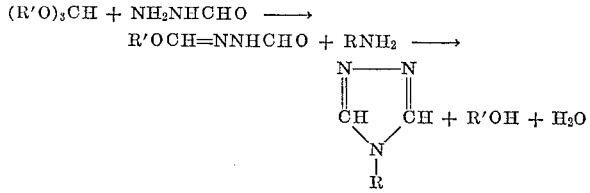

The resulting 4-substituted-1,2,4-triazoles may be used as the crude product isolated as a residue from the reaction mixture or may be purified by standard means, such as distillation.

The following Table I lists typical 4-substituted-1,2,4-triazoles useful as intermediates in the preparation of the metal salt complexes.

TABLE I 4-substituted-1,2,4-triazoles of the formula

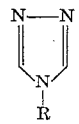

| Prep. | R | Melting (° C.) or boiling point (° C./mm.) | Empirical formula | Analytical data,[a] percent C | H | N |
|---|---|---|---|---|---|---|
| A | Cyclopropyl | 90–93° | $C_5H_7N_3$ | 54.8 (55.0) | 6.5 (6.4) | 38.4 (38.6) |
| B | n-$C_3H_7$ | 120–125°/.06 mm | $C_5H_9N_3$ | 52.8 (54.0) | 8.8 (8.1) | 37.2 (37.9) |
| C | n-$C_4H_9$ | 130–142°/2 mm | $C_6H_{11}N_3$ | J. Chem. Soc. 1967, 1664 | | |
| D | sec-$C_4H_9$ | 130°/.1 mm | $C_6H_{11}N_3$ | 56.5 (57.6) | 9.6 (8.8) | 34.2 (33.6) |
| E | i-$C_4H_9$ | 128–132°/.1 mm | $C_6H_{11}N_3$ | 57.8 (57.6) | 9.2 (8.8) | 33.6 (33.6) |
| F | t-$C_4H_9$ | 69–72° | $C_6H_{11}N_3$ | 51.0 (57.6) | 9.3 (8.8) | 39.5 (33.6) |
| G | n-$C_5H_{11}$ | 138–148°/.1 mm | $C_7H_{13}N_3$ | 60.3 (60.4) | 8.9 (9.4) | 31.1 (30.2) |
| H | i-$C_5H_{11}$ | 153–163°/.2 mm | $C_7H_{13}N_3$ | 60.5 (60.4) | 9.7 (9.4) | 30.4 (30.2) |
| I | n-$C_6H_{13}$ | 145–155°/.05 mm | $C_8H_{15}N_3$ | 62.6 (62.7) | 9.8 (9.8) | 27.3 (27.5) |
| J | 2-ethylhexyl | 147°/.05 mm | $C_{10}H_{19}N_3$ | 66.0 (66.3) | 10.8 (10.6) | 23.4 (23.2) |
| K | n-$C_8H_{17}$ | 167–174°/.01 mm | $C_{10}H_{19}N_3$ | 65.7 (66.3) | 10.7 (10.6) | 24.4 (23.2) |
| L | n-$C_{10}H_{21}$ | 35–37° | $C_{12}H_{23}N_3$ | 68.7 (68.9) | 11.1 (11.0) | 20.0 (20.1) |
| M | n-$C_{12}H_{25}$ | 51–53° | $C_{14}H_{27}N_3$ | 70.5 (70.9) | 10.6 (11.5) | 17.5 (17.7) |
| N | Propargyl | 145–153°/.05 mm | $C_5H_5N_3$ | 53.4 (56.1) | 4.7 (4.7) | 39.4 (39.2) |
| O | 1,1-dimethyl-propargyl | 108–111° | $C_7H_9N_3$ | 62.1 (62.1) | 6.8 (6.7) | 31.1 (31.2) |
| P | $HOCH_2CH_2CH_2$ | Semisolid | $C_5H_9N_3O$ | 46.8 (47.2) | 7.6 (7.1) | 29.9 (33.0) |
| Q | $C_2H_5OCH_2CH_2$ | 145–149°/.05 mm | $C_6H_{11}N_3O$ | 49.5 (51.0) | 7.3 (7.9) | 29.8 (29.8) |
| R | $CH_3OCH_2CH_2CH_2$ | 130–140°/.05 mm | $C_6H_{11}N_3O$ | 51.5 (51.1) | 8.3 (7.8) | 30.2 (29.8) |
| S | $C_2H_5OCH_2CH_2CH_2$ | 125–132°/.2 mm | $C_7H_{13}N_3O$ | 53.2 (54.2) | 8.7 (8.4) | 27.6 (27.1) |
| T | $(CH_3)_2CHOCH_2CH_2CH_2$ | 156–164°/.2 mm | $C_8H_{15}N_3O$ | 59.6 (56.8) | 8.3 (8.9) | 25.5 (24.8) |
| U | $(C_2H_5)_2NCH_2CH_2$ | 155–168/.05 mm | $C_8H_{16}N_4$ | 56.7 (57.1) | 10.6 (9.6) | 34.4 (33.3) |
| V | $C_2H_5OOCCH_2CH(CH_3)$ | 170–172°/.2 mm | $C_8H_{13}N_3O_2$ | 50.3 (52.4) | 6.5 (7.1) | 25.7 (22.9) |
| W | $C_6H_5$ | 118–121° | $C_8H_7N_3$ | J. Chem. Soc. 1967, 1664 | | |
| X | 2,4-$Cl_2C_6H_3$ | 203–206° | $C_8H_5Cl_2N_3$ | J. Med. Pharm. Chem. 5, 383 (1962) | | |
| Y | 3,4-$Cl_2C_6H_3$ | 172–174° | $C_8H_5Cl_2N_3$ | 45.1 (44.9) | 2.3 (2.3) | 19.4 (19.6) |
| Z | 3-$NO_2C_6H_4$ | 242–245° | $C_8H_6N_4O_2$ | 50.4 (50.6) | 3.1 (3.1) | 30.0 (29.5) |
| AA | 4-$NO_2C_6H_4$ | >300° | $C_8H_6N_4O_2$ | J. Med. Pharm. Chem. 5, 383 (1962) | | |
| AB | 4-$CH_3OC_6H_4$ | 108–110° | $C_9H_9N_3O$ | J. Med. Pharm. Chem. 5, 383 (1962) | | |
| AC | $C_6H_5CH_2$ | 112–114° | $C_9H_9N_3$ | J. Chem. Soc. 1967, 1664 | | |
| AD | 4-$ClC_6H_4CH_2$ | 200–208°/.05 mm | $C_9H_8ClN_3$ | 55.7 (55.8) | 4.6 (4.1) | 21.7 (21.7) |
| AE | 2,4-$Cl_2C_6H_3CH_2$ | 169–171° | $C_9H_7Cl_2N_3$ | 47.7 (47.5) | 3.4 (3.1) | 18.4 (18.4) |
| AF | 3,4-$Cl_2C_6H_3CH_2$ | 133–135° | $C_9H_7Cl_2N_3$ | 47.6 (47.5) | 3.2 (3.1) | 18.5 (18.4) |
| AG | 4-$CH_3OC_6H_4CH_2$ | 101–103° | $C_{10}H_{11}N_3O$ | 62.9 (63.4) | 5.9 (5.9) | 22.1 (22.2) |
| AH | $C_6H_5CH_2CH_2$ | 182–185°/.02 mm | $C_{10}H_{11}N_3$ | 69.0 (69.3) | 6.8 (6.4) | 24.2 (24.3) |
| AI | 4-pyridyl | 230–231° | $C_7H_6N_4$ | 57.8 (57.5) | 4.0 (4.1) | 38.1 (38.4) |
| AJ | 2-pyridyl | 162–163° | $C_7H_6N_4$ | J. Org. Chem. 18, 1368 (1953) | | |
| AK | 4-(1,2,4-triazyl) | 276–277° | $C_4H_4N_6$ | J. Chem. Soc. 1967, 1664 | | |
| AL | 3-(1,2,4-triazyl) | 190–195° | $C_4H_4N_6$ | J. Org. Chem. 18, 1368 (1953) | | |
| AM | 2-pyrimidyl | 246–249° | $C_6H_5N_5$ | 49.2 (49.0) | 3.3 (3.4) | 47.6 (47.6) |
| AN | 2-thiazyl | 127–129° | $C_5H_4N_4S$ | 39.5 (39.5) | 2.5 (2.7) | 37.2 (36.8) |
| AO | 2-benzothiazyl | 199–201° | $C_9H_6N_4S$ | 54.0 (53.5) | 3.3 (3.0) | 27.6 (27.7) |
| AP | 2-(4-chlorobenzothiazyl) | 187–189° | $C_9H_5ClN_4S$ | 46.6 (45.7) | 2.7 (2.1) | 24.1 (23.7) |
| AQ | $C_6H_5OCH_2CH_2$ | 75–78° | $C_{10}H_{11}N_3O$ | 62.0 (63.5) | 5.9 (5.9) | 21.5 (22.2) |
| AR | 2,4-$Cl_2C_6H_3OCH_2CH_2$ | 115–117° | $C_{10}H_9Cl_2N_3O$ | 46.6 (46.5) | 3.7 (3.5) | 16.3 (16.3) |
| AS | 4-$ClC_6H_4OCH_2CH_2$ | 74–75° | $C_{10}H_{10}ClN_3O$ | 50.8 (53.8) | 4.4 (4.5) | 20.9 (18.9) |
| AT | 4-$ClC_6H_4SCH_2CH_2$ [b][c] | 73–75° | $C_{10}H_{10}ClN_3S$ | 49.9 (50.3) | 4.2 (4.2) | 14.7 (14.7) |
| AU | 4-$CH_3OC_6H_4SCH_2CH_2$ [b][d] | 74–76° | $C_{11}H_{13}N_3OS$ | 56.2 (56.2) | 5.7 (5.5) | 18.1 (17.9) |
| AV | 3,4-$Cl_2C_6H_3SCH_2CH_2$ [b][e] | 127–129° | $C_{10}H_9Cl_2N_3S$ | 43.8 (43.7) | 3.5 (3.3) | 15.1 (15.3) |

[a] Figures in parentheses are those calculated from the empirical formula.
[b] The intermediate Aryl-$SCH_2CH_2NH_2$ was made by reaction of 2-chloroethylamine hydrochloride with the appropriate sodium thiophenate.
[c] 4-$ClC_6H_4SCH_2CH_2NH_2$ distilled at 97–100° C./1 mm. and was found by analysis to contain 51.2% C, 5.5% H, 19.1% Cl, 7.32% N and 16.2% S; calculated for $C_8H_{10}ClNS$ is 51.1% C, 5.4% H, 18.9% Cl, 7.5% N and 17.1% S.
[d] 4-$CH_3OC_6H_4SCH_2CH_2NH_2$ distilled at 110–116° C./.01 mm. and was found by analysis to contain 57.7% C, 6.9% H, 7.3% N, 11.0% O and 17.3% S; calculated for $C_9H_{13}NOS$ is 59.0% C, 7.1% H, 7.7% N, 8.7% O and 17.5% S.
[e] 3,4-$Cl_2C_6H_3SCH_2CH_2NH_2$ distilled at 160–161° C./.05 mm. and was found by analysis to contain 43.0% C, 4.6% H, 32.0% Cl, 6.2% N and 14.3% S; calculated for $C_8H_9Cl_2NS$ is 43.3% C, 4.0% H, 32.0% Cl, 6.3% N and 14.4% S.

The following are typical examples of preparations of 4-substituted-1,2,4-triazole-metal salt complexes.

EXAMPLE 4

Preparation of 4-butyl-1,2,4-triazole-nickel nitrate complex (a) Preparation of 4-butyl-1,2,4-triazole A 2-liter flask was charged with 440 g. (3 moles) of triethyl orthoformate, 120 g. (2 moles) of formylhydrazine and 800 ml. of anhydrous methanol. The reaction mixture was stirred at reflux temperature (65–70° C.) for 3.5 hrs. The progress of the reaction was followed hourly by means of gas-liquid chromatography. The reaction mixture was cooled to 60° C. and 146 g. (2 moles) of n-butylamine was added in 15 minutes. A slight exotherm raised the temperature about 5° C. The reaction mixture was stirred at reflux temperature for 3 hours and was then stripped of solvent and excess triethyl orthoformate by heating on a steam bath at reduced pressure, down to 20 mm. There was obtained a yellow oil residue of 250 g. which by elution gas-liquid chromatography was shown to be at least 85% of 4-butyl-1,2,4-triazole. A further stripping of this residue at a pot temperature of 190° C. and 10 mm. pressure gave 216 g. of light amber oil residue, which was an 86% yield of crude 4-butyl-1,2,4-triazole, shown to be 93% pure by gas-liquid chromatography. The product was further purified by distillation. The main fraction distilled at 185° C. at 2 mm. pressure and was a 77% weight yield of 4-n-butyl-1,2,4-triazole melting at 50° C.

(b) Preparation of 4-butyl-1,2,4-triazole-nickel nitrate complex

An aqueous solution of 1.16 g. (0.004 mole) of nickel nitrate in 10 ml. of water was added to an aqueous solution of 1 g. (0.008 mole) of 4-butyl-1,2,4-triazole in 10 ml. of water. A precipitate resulted and was filtered off, washed with water and dried to give 1.2 g. of 4-butyl-1,2,4-triazole-nickel nitrate complex melting at >250° C. in which the mole ratio of triazole to $Ni(NO_3)_2$ was 2:1.

When an equivalent quantity of nickel chloride was substituted for nickel nitrate in the above, a blue solution resulted. The 4-butyl-1,2,4-triazole-nickel chloride complex in which the mole ratio of triazole to $NiCl_2$ was 2:1 was isolated by stripping off the water.

EXAMPLE 9

Preparation of 4-butyl-1,2,4-triazole silver nitrate complex

An aqueous solution of 1.36 g. (0.008 mole) of silver nitrate in 10 ml. of water was added to an aqueous solution of 1 g. (0.008 mole) of 4-butyl-1,2,4,-triazole in 10 ml. of water. A precipitate formed and was filtered off, washed with water and dried to give 1.6 g. of 4-butyl-1,2,4-triazole-silver nitrate complex melting at 209–211° C. in which the mole ratio of triazole to $AgNO_3$ was 1:1. When twice the amount of triazole was employed no precipitate formed.

EXAMPLE 10

Preparation of 4-butyl-1,2,4-triazole-mercuric chloride complex

An aqueous solution of 2.16 g. (0.008 mole) of mercuric chloride in 20 ml. of water was added to an aqueous solution of 1 g. (0.008 mole) of 4-butyl-1,2,4-triazole in 10 ml. of water. A precipitate formed and was filtered off, washed with water and dried to give 2.9 g. of 4-butyl-1,2,4-triazole-mercuric chloride complex melting at 105–107° C. in which the mole ratio of triazole to $HgCl_2$ was 1:1. The same product was formed when twice as much 4-butyl-1,2,4-triazole was employed.

EXAMPLE 11

Preparation of 4-butyl-1,2,4-triazole-zinc ethylenebisdithiocarbamate complex

To a solution of 56.3 g. (0.2 mole) of 91% disodium ethylenebisdithiocarbamate in 177 g. of deionized water in a beaker was added 25 g. (0.2 mole) of 4-butyl-1,2,4-triazole. To the resulting solution was added over a period of 29 minutes a solution of 27.3 g. (0.2 mole) of zinc chloride in 27.3 g. of water. A slight exotherm raised the temperature from 26° to 31° C. and a thick white slurry resulted. After stirring for 1 hr. the product was filtered giving 229 g. of filtrate having a pH of about 8 and a wet cake. The solid residue was washed with 500 ml. of deionized water and dried to constant weight to give 76 g. of white solid melting with decomposition at 122° to 124° C. The product is a complex containing equimolar ratios of 4-butyl-1,2,4-triazole, zinc ion and ethylenebisdithiocarbamate.

EXAMPLE 20

Preparation of 4-benzyl-1,2,4-triazole-zinc chloride complex

An ethanolic solution of 0.428 g. (0.00314 mole) of zinc chloride in 20 ml. of ethanol was added to an ethanolic solution of 1 g. (0.00628 mole) of 4-benzyl-1,2,4-triazole in 25 ml. of ethanol. A precipitate formed and was filtered off, washed with ethanol and dried to give 1.2 g. of 4-benzyl-1,2,4-triazole-zinc chloride complex melting at 238–242° C. in which the mole ratio of triazole to $ZnCl_2$ was 2:1.

In Tables II and III are listed typical examples of the novel compounds of this invention with physical characteristics and analyses.

TABLE II

Compounds of the structure

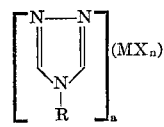

| Example | R | a | M | X | n | Melting point (° C.) |
|---|---|---|---|---|---|---|
| 1 | $C_4H_9$ | 2 | $Cu^{++}$ | Cl | 2 | 210–220 |
| 2 | $C_4H_9$ | 2 | $Fe^{++}$ | Cl | 2 | 145–155 |
| 3 | $C_4H_9$ | 2 | $Ni^{++}$ | Cl | 2 | >250 |
| 4 | $C_4H_9$ | 2 | $Ni^{++}$ | $NO_3$ | 2 | >250 |
| 5 | $C_4H_9$ | 2 | $Zn^{++}$ | Cl | 2 | 210–212 |
| 6 | $C_4H_9$ | 2 | $Zn^{++}$ | $NO_3$ | 2 | 235–238 |
| 7 | $C_4H_9$ | 2 | $Zn^{++}$ | $SO_4$ | 1 | 269–271 |
| 8 | $C_4H_9$ | 2 | $Zn^{++}$ | Acetate | 2 | 123–125 |
| 9 | $C_4H_9$ | 1 | $Ag^+$ | $NO_3$ | 1 | 209–211 |
| 10 | $C_4H_9$ | 1 | $Hg^{++}$ | Cl | 2 | 105–107 |
| 11 | $C_4H_9$ | 1 | $Zn^{++}$ | $(-CH_2NHCSS-)_2$ | 1 | c 122–124 |
| 12 | $C_4H_9$ | 1 | $Cu^{++}$ b | $(-CH_2NHCSS-)_2$ | 1 | c 110–120 |
| 13 | $C_4H_9$ | 1 | $Mn^{++}$ b | $(-CH_2NHCSS-)_2$ | 1 | c 195–200 |
| 14 | $C_4H_9$ | 1 | $Ni^{++}$ | $(-CH_2NHCSS-)_2$ | 1 | c 194–198 |
| 15 | $C_4H_9$ | 1 | $Cd^{++}$ | $(-CH_2NHCSS-)_2$ | 1 | c 250–260 |
| 16 | $C_4H_9$ | 1 | $Fe^{++}$ | $(-CH_2NHCSS-)_2$ | 1 | c 140–150 |
| 17 | $C_4H_9$ | 1 | $Sn^{++}$ | $(-CH_2NHCSS-)_2$ | 1 | c 125–127 |
| 18 | Iso-$C_5H_{11}$ | 2 | $Zn^{++}$ | Cl | 2 | 157–158 |
| 19 | n-$C_8H_{17}$ | 2 | $Zn^{++}$ | Cl | 2 | 140–144 |
| 20 | $C_6H_5CH_2$ | 2 | $Zn^{++}$ | Cl | 2 | 238–242 |
| 21 | $C_6H_5$ | 2 | $Zn^{++}$ | Cl | 2 | 226–228 |
| 22 | 2-pyridyl | 2 | $Zn^{++}$ | Cl | 2 | 192–193 | b Made with either the chloride or sulfate salt.
c Dec.

TABLE III

Analytical data [a] on 1-substituted-1,2,4-triazole metal salt complexes

| Example | Empirical formula | C | H | N | Other |
|---|---|---|---|---|---|
| 1 | $C_6H_{11}N_3 \cdot 1/2$ $CuCl_2$ | 35.1 (37.6) | 5.8 (5.7) | 20.6 (21.9) | Cu, 14.3 (16.5); $H_2O$, 6.5 (none). |
| 2 | $C_6H_{11}N_3 \cdot 1/2$ $FeCl_2$ | 38.1 (38.2) | 6.1 (5.8) | 22.1 (22.3) | Fe, 12.0 (14.9). |
| 3 | $C_6H_{11}N_3 \cdot 1/2$ $NiCl_2$ | 33.9 (37.9) | 5.8 (5.8) | 22.1 (20.8) | Ni, 14.6 (15.5). |
| 4 | $C_6H_{11}N_3 \cdot 1/2$ $Ni(NO_3)_2$ | 33.3 (35.8) | 5.1 (5.9) | 25.8 (25.9) | Ni, 25.8 (25.9). |
| 5 | $C_6H_{11}N_3 \cdot 1/2$ $ZnCl_2$ | 37.5 (37.3) | 5.4 (5.7) | 20.1 (21.7) | Zn, 18.2 (18.3). |
| 6 | $C_6H_{11}N_3 \cdot 1/2$ $Zn(NO_3)_2$ | 35.9 (32.7) | 5.1 (5.1) | 25.3 (25.4) | Zn, 11.1 (14.8). |
| 7 | $C_6H_{11}N_3 \cdot 1/2$ $ZnSO_4$ | 34.3 (35.0) | 5.5 (5.4) | 20.2 (20.4) | Zn, 14.7 (15.8). |
| 8 | $C_6H_{11}N_3 \cdot 1/2$ $Zn(C_2H_3O_2)_2$ | 44.3 (44.3) | 6.5 (6.5) | 19.6 (19.4) | Zn, 15.2 (15.1). |
| 9 | $C_6H_{11}N_3 \cdot AgNO_3$ | 24.6 (24.4) | 3.9 (3.7) | 19.3 (19.0) | Ag, 35.0 (36.6). |
| 10 | $C_6H_{11}N_3 \cdot Hg\ Cl_2$ | 18.2 (18.2) | 2.8 (2.8) | 10.5 (10.6) | Hg, 36.9 (50.5). |
| 11 | $C_6H_{11}N_3 \cdot ZnC_4H_6N_2S_4$ | 28.0 (30.0) | 4.1 (4.3) | 16.4 (17.5) | Zn, 15.9 (16.3). |
| 12 | $C_6H_{11}N_3 \cdot CuC_4H_6N_2S_4$ | 25.2 (30.1) | 3.4 (4.3) | 15.2 (17.5) | Cu, 12.9 (15.9). |
| 13 | $C_6H_{11}N_3 \cdot MnC_4H_6N_2S_4$ | 30.0 (30.7) | 4.7 (4.4) | 17.8 (17.9) | Mn, 11.7 (14.1). |
| 14 | $C_6H_{11}N_3 \cdot NiC_4H_6N_2S_4$ | 30.5 (30.9) | 4.4 (4.3) | 17.8 (17.8) | Ni, 13.8 (14.9). |
| 15 | $C_6H_{11}N_3 \cdot CdC_4H_6N_2S_4$ | 24.9 (26.8) | 3.7 (3.8) | 15.1 (15.6) | Cd, 25.4 (25.1). |
| 16 | $C_6H_{11}N_3 \cdot FeC_4H_6N_2S_4$ | 33.1 (30.7) | 5.0 (4.4) | 20.1 (17.9) | Fe, 14.4 (14.3). |
| 17 | $C_6H_{11}N_3 \cdot SnC_4H_6N_2S_4$ | 23.8 (26.4) | 3.4 (3.8) | 13.7 (15.4) | Sn, 22.2 (26.1). |
| 18 | $C_7H_{13}N_3 \cdot 1/2$ $ZnCl_2$ | 38.2 (40.6) | 6.0 (6.3) | 19.2 (20.3) | Zn, 17.5 (15.7). |
| 19 | $C_{10}H_{19}N_3 \cdot 1/2$ $ZnCl_2$ | 48.9 (48.1) | 8.1 (7.7) | 17.3 (16.9) | Zn, 15.1 (13.1). |
| 20 | $C_9H_9N_3 \cdot 1/2$ $ZnCl_2$ | 47.4 (47.6) | 4.1 (4.0) | 18.1 (18.5) | Zn, 14.7 (14.3). |
| 21 | $C_8H_7N_3 \cdot 1/2$ $ZnCl_2$ | 44.8 (45.1) | 3.3 (3.3) | 19.9 (19.7) | Zn, 15.6 (15.3). |
| 22 | $C_7H_6N_4 \cdot 1/2$ $ZnCl_2$ | 39.6 (39.3) | 2.9 (2.8) | 26.2 (26.2) | Zn, 16.0 (15.2). |

[a] Figures in parentheses are those calculated from the empirical formula.

The compounds of this invention are fungicides and are particularly useful for the control of wheat leaf rust, *Puccinia recondita* and in some instances for the control of damping-off diseases. Compounds of the type of Examples 11–17 have exhibited broad spectrum fungicidal activity.

The intermediate 4 - substituted - 1,2,4-triazoles of Formula II are also fungicides for the control of cereal rusts, but in certain instances have exhibited phytotoxicity. The following Table IV gives the average percent injury in a standard preliminary postemergence herbicidal evaluation at 10 lbs. per acre for typical preparations listed in Table I. In this test, typical monocotyledonous (Monocots) and typical dicotyledonous (Dicots) plants were sprayed with the test chemical two weeks after planting and the average percent injury was observed 2 weeks later.

TABLE IV

Herbicidal activity of 4-substituted-1,2,4-triazoles

| Preparation* | Average percent injury | |
|---|---|---|
| | Monocots | Dicots |
| A | 0 | 40 |
| B | 2 | 20 |
| C | 12 | 65 |
| D | 15 | 22 |
| E | 5 | 50 |
| F | 0 | 35 |
| H | 0 | 58 |
| I | 15 | 58 |
| J | 22 | 75 |
| K | 75 | 92 |
| L | 28 | 60 |
| M | 20 | 58 |
| N | 0 | 5 |
| O | 35 | 80 |
| P | 32 | 80 |
| Q | 30 | 88 |
| R | 0 | 20 |
| S | 45 | 68 |
| T | 38 | 72 |
| U | 52 | 55 |
| V | 40 | 85 |
| W | 15 | 52 |
| X | 38 | 46 |
| Y | 0 | 65 |
| Z | 35 | 22 |
| AA | 22 | 35 |
| AB | 32 | 30 |
| AC | 12 | 60 |
| AD | 18 | 58 |
| AE | 38 | 95 |
| AF | 42 | 90 |
| AG | 8 | 80 |
| AH | 5 | 45 |
| AI | 12 | 38 |
| AJ | 0 | 0 |
| AK | 15 | 10 |
| AL | 15 | 35 |
| AM | 0 | 5 |
| AN | 20 | 32 |
| AO | 32 | 68 |
| AP | 28 | 58 |
| AQ | 40 | 95 |
| AR | 55 | 100 |
| AS | 58 | 80 |
| AT | 60 | 98 |
| AU | 55 | 62 |
| AV | 30 | 88 |

* See Table I.

The phytotoxicity of certain of the 4-substituted-1,2,4-triazoles is particularly manifested when they are employed as a systemic rust fungicide by seed treatment. It has been found that the novel 4-substituted-1,2,4-triazole-metal salt complexes of this invention are much safer to use, particularly as when applied by the seed treatment method. The following type experiment was run to illustrate this. Wheat seeds (Pennoll variety) were treated with the test compounds at rates of 1, 2 and 4 ounces per 100 pounds of seed. The treated seeds were planted in wet non-sterile soil and held at 75° F. One week after planting, the injury to the germinating seed was observed by standard comparisons.

The percent control of wheat leaf rust, *Puccinia recondita*, was measured for the same treated seed. In this test, wheat seedlings were inoculated with the leaf rust organism seven days after planting and one week thereafter the percent control of the disease was determined. Table V gives the results of the above tests in comparison with 4-butyl-1,2-4-triazole (Preparation C). Injury ratings are included for the treatments involving 4 ounces per 100 pounds of seed of the test compounds.

TABLE V

Biological activity of 4-substituted-1,2,4-triazole-metal salt complexes

| Example [a] | Percent leaf rust control | | | Injury [c] |
|---|---|---|---|---|
| | 4 oz. | 2 oz. | 1 oz.[b] | |
| Preparation C | 100 | 100 | 100 | +++. |
| 1 | 100 | 100 | 100 | ++. |
| 2 | 100 | 100 | 100 | + to ++. |
| 3 | 100 | 100 | 100 | +++. |
| 6 | 100 | 100 | 100 | ++. |
| 10 | 100 | 100 | 100 | +. |
| 11 | 100 | 100 | 100 | None. |
| 12 | 100 | 100 | 100 | ++. |
| 13 | 100 | 100 | 100 | ++. |
| 14 | 100 | 100 | 100 | ++. |
| 20 | 100 | 100 | 100 | ++. |
| 21 | 99 | 94 | 89 | None. |
| 22 | 94 | 85 | 49 | +. |

[a] See Tables I and II.
[b] Ounces per 100 lbs. of seed.
[c] +++=severe; ++=moderate; +=slight.

It will be seen that conversion of a 4-substituted-1,2,4-triazole to a metal salt complex reduces the phytotoxic properties without impairing the fungicidal activity versus leaf rust.

As agricultural fungicides, the 4 - substituted - 1,2,4-triazole-metal salt complexes of this invention may be applied to various loci such as the seed, the soil or the foliage. For such purposes these compounds may be used in the technical or pure form as prepared, as solutions or as formulations. The compounds are usually taken up in a carrier or are formulated so as to render them suitable for subsequent dissemination as pesticides. For example, the 4-substituted-1,2,4-triazole-metal salt complexes may be formulated as wettable powders, emulsifiable concentrates, dusts, granular formulations, aerosols, or flowable emulsion concentrates. In such formulations, the compounds are extended with a liquid or solid carrier and, when desired, suitable surfactants are incorporated.

It is usually desirable, particularly in the case of foliar spray formulations, to include adjuvants, such as wetting agents, spreading agents, dispersing agents, stickers, adhesives and the like in accordance with agricultural practices. Such adjuvants commonly used in the art may be found in the John W. McCutcheon, Inc. publication "Detergents and Emulsifiers 1968 Annual."

In case the 4-substituted 1,2,4 - triazole - metal salt complex is water-soluble, it may be dissolved directly in water to provide an aqueous solution for application. Similarly, the compounds of this invention may be dissolved in a water-miscible liquid, such as methanol, ethanol, isopropanol, acetone, dimethylformamide or dimethyl sulfoxide or mixtures of these with water and such solutions extended with water. The concentration of the solution may vary from 2% to 98% with a preferred range being 25% to 75%.

For the preparation of emulsifiable concentrates, the compound may be dissolved in organic solvents, such as xylene, pine oil, orthodichlorobenzene, methyl oleate, or a mixture of solvents, together with an emulsifying agent which permits dispersion of the pesticide in water. The concentration of the active ingredient in emulsifiable concentrates is usually 10% to 25% and, in flowable emulsion concentrates, this may be as high as 75%.

Wettable powders suitable for spraying may be prepared by admixing the compound with a finely divided solid, such as clays, inorganic silicates and carbonates, and silicas, and incorporating wetting agents, sticking agents, and/or dispersing agents in such mixtures. The concentration of active ingredients in such formulations is usually in the range of 20% to 98%, preferably 40% to 75%.

Dusts are prepared by mixing the 4-substituted-1,2,4-triazole-metal salt complex with finely divided inert solids which may be organic or inorganic in nature. Materials useful for this purpose include botanical flours, silicas, silicates, carbonates and clays. One convenient method of preparing a dust is to dilute a wettable powder with a finely divided carrier. Dust concentrates containing 20% to 80% of the active ingredient are commonly made and are subsequently diluted to 1% to 10% use concentration.

The 4 - substituted - 1,2,4 - triazole-metal salt complex can be applied as fungicidal sprays by the methods commonly employed, such as conventional high-gallonage hydraulic sprays, low gallonage sprays, airblast spray, aerial sprays and dusts. The dilution and rate of application will depend upon the type of equipment employed, the method of application and the disease to be controlled, but the amount is usually 0.1 lb. to 25 lbs. per acre of the active ingredient.

As a seed protectant, the amount of toxicant coated on the seed is usually at a dosage rate of about 0.1 to 20 ounces per hundred pounds of seed. As a soil fungicide the chemical may be incorporated in the soil or applied to the surface usually at a rate of 0.1 to 25 lbs. per acre. As a foliar fungicide the toxicant is usually applied to growing plants at a rate of 0.25 to 10 pounds per acre.

The compounds of this invention may be used as the sole biocidal agents alone or in admixture, or they may be employed with other pesticides, such as other fungicides, insecticides, miticides and bird repellents.

Other fungicides which may be combined with the compounds of this invention include dithiocarbamates and derivatives such as ferric dimethyldithiocarbamates (ferbam), zinc dimethyldithiocarbamate (ziram), manganese ethylenebisdithiocarbamate (maneb) and its coordination product with zinc ion, zinc ethylenebisdithiocarbamate (zineb), tetramethylthiuram disulfide (thiram) and 3,5 - dimethyl - 1,3,5 - 2H - tetrahydrothiadiazine-2-thione; nitrophenol derivatives such as dinitro-(1-methylheptyl) - phenyl crotonate (dinocap), 2 - sec - butyl-4,6 - dinitrophenyl 3,3 - dimethyl-acrylate (binapacryl) and 2 - sec - butyl - 4,6 - dinitrophenyl isopropyl carbonate; heterocyclic structures such as N-trichloromethylthio - tetrahydro - phthalimide (captan), N - trichloromethylthio - phthalimide (folpet), 2 - heptadecyl-2-imidazoline (glyodin), 2,4-dichloro - 6 - (o-chloroanilino)-s-triazine, diethyl phthalimidophosphorothioate, 5-amino-1 - [bis(dimethylamino)phosphinyl] - 3 - phenyl - 1,2,4-triazole, 5 - ethoxy - 3 - trichloromethyl - 1,2,4 - thiadiazole, 2,3-dicyano - 1,4 - dithiaanthraquinone (dithianon), 2 - thio - 1,3 - dithio - [4,5-b]quinoxaline (thioquinox), 1 - (butylcarbamoyl) - 2 - benzimidazole carbamic acid methyl ester (benomyl), 4 - (2-chlorophenylhydrazono)-3-methyl - 5 - isoxazolone, pyridine - 2 - thiol - 1 - oxide, 8 - hydroxyquinoline, 2,3 - dihydro - 5 - carboxanilido-6 - methyl - 1,4 - oxathiin - 4,4 - dioxide, and bis (p-chlorophenyl) - 3 - pyridinemethanol; and miscellaneous fungicides such as dodecylguanidine acetate (dodine), 3-[2-(3,5 - dimethyl - 2 - oxycyclohexyl) - 2 - hydroxyethyl]glutarimide (cycloheximide), phenylmercuric acetate, N-ethylmercuri - 1,2,3,6 - tetrahydro - 3,6 - endomethano - 3,4,5,6,7,7 - hexachlorophthalimide, phenylmercuric monoethanolammonium lactate, 2,3 - dichloro-1,4 - napthoquinone, 1,4 - dichloro - 2,5 - dimethoxybenzene, p-dimethylaminobenzenediazo sodium sulfonate, 2 - chloro - 1 - nitropropane, polychloronitrobenzenes such as pentachloronitrobenzene, methyl isothiocyanate, fungicidal antibiotics such as griseofulvin or kasugamycin, tetrafluorodichloroacetone, 1 - phenylthiosemicarbazide, Bordeaux mixture, nickel - containing compounds and sulfur.

We claim:

1. A compound of the general formula:

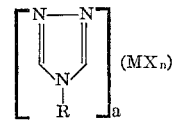

wherein
R is selected from the group consisting of alkyl, straight or branched, of 1 to 18 carbon atoms, benzyl, phenyl, and pyridyl;
M is a cation selected from the group consisting of cadmium, cobaltous, cupric, ferrous, ferric, manganous, mercuric, nickel, silver, stannous and zinc;
X is an anion, selected from the group consisting of acetate, a halide, nitrate, sulfate, and alkylenebisdithiocarbamate wherein alkylene is ethylene or propylene N-mono-($C_1$–$C_6$ alkyl) dithiocarbamate and N,N-di ($C_1$–$C_6$ alkyl) dithiocarbamate;
$a$ is the integer 1 when M is mercuric or silver or when X is alkylenebisdithiocarbamate and is the integer 2 for all other definitions of M and X; and
$n$ is an integer which for the anion X satisfies the valence of the metal ion M.

2. A compound according to claim 1 wherein R is butyl.

3. A compound according to claim 2 wherein M is cupric.

4. A compound according to claim 2 wherein M is ferrous.

5. A compound according to claim 2 wherein M is manganous.

6. A compound according to claim 2 wherein M is mercuric.

7. A compound according to claim 2 wherein M is zinc.

8. A compound according to claim 2 wherein X is ethylenebisdithiocarbamate.

9. The compound according to claim 2 which is 4-butyl-1,2,4-triazole-cupric chloride complex.

10. The compound according to claim 2 which is 4-butyl-1,2,4-triazole-zinc ethylenebisdithiocarbamate complex.

References Cited

UNITED STATES PATENTS 1,580,572   4/1926   Rathsburg _____ 260—299

ALEX MAZEL, Primary Examiner

R. J. GALLAGHER, Assistant Examiner

U.S. Cl. X.R.

71—82, 93; 260—242, 256.4 N, 296 R, 305, 306.8 R, 308 R, 561 H; 424—245